(12) United States Patent
Martens et al.

(10) Patent No.: US 11,558,129 B1
(45) Date of Patent: Jan. 17, 2023

(54) SYSTEM AND METHOD FOR CALIBRATING VECTOR NETWORK ANALYZER MODULES

(71) Applicant: ANRITSU COMPANY, Morgan Hill, CA (US)

(72) Inventors: Jon Martens, San Jose, CA (US); Gary Chock, San Jose, CA (US); Jamie Tu, San Jose, CA (US); Elena Vayner, San Jose, CA (US); Amruth Sai Gandavarapu, San Jose, CA (US); Mrunal Damle, Sunnyvale, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 17/208,845

(22) Filed: Mar. 22, 2021

Related U.S. Application Data

(60) Provisional application No. 62/993,215, filed on Mar. 23, 2020.

(51) Int. Cl.
  *H04B 17/309* (2015.01)
  *H04B 17/14* (2015.01)

(52) U.S. Cl.
  CPC .......... *H04B 17/309* (2015.01); *H04B 17/14* (2015.01)

(58) Field of Classification Search
  CPC .................................................. H04B 17/309
  See application file for complete search history.

(56) References Cited

U.S. PATENT DOCUMENTS

| | | | |
|---|---|---|---|
| 5,801,525 A | 9/1998 | Oldfield | |
| 5,812,039 A | 9/1998 | Oldfield | |
| 5,909,192 A | 6/1999 | Finch | |
| 5,977,779 A | 11/1999 | Bradley | |
| 6,049,212 A | 4/2000 | Oldfield | |
| 6,291,984 B1 | 9/2001 | Wong | |
| 6,316,945 B1 | 11/2001 | Kapetanic | |
| 6,331,769 B1 | 12/2001 | Wong | |
| 6,496,353 B1 | 12/2002 | Chio | |
| 6,504,449 B2 | 1/2003 | Constantine | |
| 6,509,821 B2 | 1/2003 | Oldfield | |
| 6,525,631 B1 | 2/2003 | Oldfield | |
| 6,529,844 B1 | 3/2003 | Kapetanic | |
| 6,548,999 B2 | 4/2003 | Wong | |
| 6,643,597 B1 * | 11/2003 | Dunsmore | G01R 27/28 702/104 |
| 6,650,123 B2 | 11/2003 | Martens | |
| 6,665,628 B2 | 12/2003 | Martens | |

(Continued)

OTHER PUBLICATIONS

Akmal, M. et al., "An Enhanced Modulated Waveform Measurement System for the Robust Characterization of Microwave Devices under Modulated Excitation", Proceedings of the 6th European Microwave Integrated Circuits Conference, Oct. 10-11, 2011, Manchester, UK, © 2011, pp. 180-183.

(Continued)

*Primary Examiner* — Hsinchun Liao
(74) *Attorney, Agent, or Firm* — Kilpatrick Townsend & Stockton, LLP

(57) ABSTRACT

Systems and methods for calibrating VNA modules which dynamically assigns match utilization to improve overall calibration accuracy and reduce problems from a non-optimal set of calibration components and simplify user input requirements during calibration.

20 Claims, 3 Drawing Sheets

(56) References Cited

U.S. PATENT DOCUMENTS

| | | |
|---|---|---|
| 6,670,796 B2 | 12/2003 | Mori |
| 6,680,679 B2 | 1/2004 | Stickle |
| 6,700,366 B2 | 3/2004 | Truesdale |
| 6,700,531 B2 | 3/2004 | Abou-Jaoude |
| 6,714,898 B1 | 3/2004 | Kapetanic |
| 6,766,262 B2 | 7/2004 | Martens |
| 6,832,170 B2 | 12/2004 | Martens |
| 6,834,180 B1 * | 12/2004 | Marshall ............... H04W 24/00 455/67.11 |
| 6,839,030 B2 | 1/2005 | Noujeim |
| 6,882,160 B2 | 4/2005 | Martens |
| 6,888,342 B2 | 5/2005 | Bradley |
| 6,894,581 B2 | 5/2005 | Noujeim |
| 6,917,892 B2 | 7/2005 | Bradley |
| 6,928,373 B2 | 8/2005 | Martens |
| 6,943,563 B2 | 9/2005 | Martens |
| 7,002,517 B2 | 2/2006 | Noujeim |
| 7,011,529 B2 | 3/2006 | Oldfield |
| 7,016,024 B2 | 3/2006 | Bridge |
| 7,019,510 B1 | 3/2006 | Bradley |
| 7,054,776 B2 | 5/2006 | Bradley |
| 7,068,046 B2 | 6/2006 | Martens |
| 7,088,111 B2 | 8/2006 | Noujeim |
| 7,108,527 B2 | 9/2006 | Oldfield |
| 7,126,347 B1 | 10/2006 | Bradley |
| 7,173,423 B2 | 2/2007 | Buchwald |
| 7,284,141 B2 | 10/2007 | Stickle |
| 7,304,469 B1 | 12/2007 | Bradley |
| 7,307,493 B2 | 12/2007 | Feldman |
| 7,509,107 B2 | 3/2009 | Bradley |
| 7,511,577 B2 | 3/2009 | Bradley |
| 7,521,939 B2 | 4/2009 | Bradley |
| 7,545,151 B2 | 6/2009 | Martens |
| 7,683,602 B2 | 3/2010 | Bradley |
| 7,683,633 B2 | 3/2010 | Noujeim |
| 7,705,582 B2 | 4/2010 | Noujeim |
| 7,746,052 B2 | 6/2010 | Noujeim |
| 7,764,141 B2 | 7/2010 | Noujeim |
| 7,872,467 B2 | 1/2011 | Bradley |
| 7,924,024 B2 | 4/2011 | Martens |
| 7,957,462 B2 | 6/2011 | Aboujaoude |
| 7,983,668 B2 | 7/2011 | Tiernan |
| 8,027,390 B2 | 9/2011 | Noujeim |
| 8,058,880 B2 | 11/2011 | Bradley |
| 8,145,166 B2 | 3/2012 | Barber |
| 8,156,167 B2 | 4/2012 | Bradley |
| 8,159,208 B2 | 4/2012 | Brown |
| 8,169,993 B2 | 5/2012 | Huang |
| 8,185,078 B2 | 5/2012 | Martens |
| 8,278,944 B1 | 10/2012 | Noujeim |
| 8,294,469 B2 | 10/2012 | Bradley |
| 8,305,115 B2 | 11/2012 | Bradley |
| 8,306,134 B2 | 11/2012 | Martens |
| 8,410,786 B1 | 4/2013 | Bradley |
| 8,417,189 B2 | 4/2013 | Noujeim |
| 8,457,187 B1 | 6/2013 | Aboujaoude |
| 8,493,111 B1 | 7/2013 | Bradley |
| 8,498,582 B1 | 7/2013 | Bradley |
| 8,538,350 B2 | 9/2013 | Varjonen |
| 8,593,158 B1 | 11/2013 | Bradley |
| 8,629,671 B1 | 1/2014 | Bradley |
| 8,630,591 B1 | 1/2014 | Martens |
| 8,666,322 B1 | 3/2014 | Bradley |
| 8,718,586 B2 | 5/2014 | Martens |
| 8,760,148 B1 | 6/2014 | Bradley |
| 8,816,672 B1 | 8/2014 | Bradley |
| 8,816,673 B1 | 8/2014 | Barber |
| 8,884,664 B1 | 11/2014 | Bradley |
| 8,903,149 B1 | 12/2014 | Noujeim |
| 8,903,324 B1 | 12/2014 | Bradley |
| 8,942,109 B2 | 1/2015 | Dorenbosch |
| 9,103,856 B2 | 8/2015 | Brown |
| 9,103,873 B1 | 8/2015 | Martens |
| 9,153,890 B2 | 10/2015 | Warwick |
| 9,176,174 B1 | 11/2015 | Bradley |
| 9,176,180 B1 | 11/2015 | Bradley |
| 9,210,598 B1 | 12/2015 | Bradley |
| 9,239,371 B1 | 1/2016 | Bradley |
| 9,287,604 B1 | 3/2016 | Noujeim |
| 9,331,633 B1 | 5/2016 | Robertson |
| 9,337,941 B2 | 5/2016 | Emerson |
| 9,366,707 B1 | 6/2016 | Bradley |
| 9,455,792 B1 | 9/2016 | Truesdale |
| 9,560,537 B1 | 1/2017 | Lundquist |
| 9,571,142 B2 | 2/2017 | Huang |
| 9,588,212 B1 | 3/2017 | Bradley |
| 9,594,370 B1 | 3/2017 | Bradley |
| 9,606,212 B1 | 3/2017 | Martens |
| 9,680,245 B2 | 6/2017 | Warwick |
| 9,685,717 B2 | 6/2017 | Warwick |
| 9,696,403 B1 | 7/2017 | Elder-Groebe |
| 9,733,289 B1 | 8/2017 | Bradley |
| 9,753,071 B1 | 9/2017 | Martens |
| 9,768,892 B1 | 9/2017 | Bradley |
| 9,860,054 B1 | 1/2018 | Bradley |
| 9,964,585 B1 | 5/2018 | Bradley |
| 9,967,085 B1 | 5/2018 | Bradley |
| 9,977,068 B1 | 5/2018 | Bradley |
| 10,003,453 B1 | 6/2018 | Bradley |
| 10,006,952 B1 | 6/2018 | Bradley |
| 10,064,317 B1 | 8/2018 | Bradley |
| 10,116,432 B1 | 10/2018 | Bradley |
| 2004/0135726 A1 * | 7/2004 | Shamir ................. H01Q 7/005 343/700 MS |
| 2004/0153265 A1 * | 8/2004 | Martens ............... G01R 35/005 702/65 |

OTHER PUBLICATIONS

Cunha, Telmo R. et al., "Characterizing Power Amplifier Static AM/PM with Spectrum Analyzer Measurements", IEEE © 2014, 4 pages.

Fager, Christian et al., "Prediction of Smart Antenna Transmitter Characteristics Using a New Behavioral Modeling Approach" IEEE ©2014, 4 pages.

Fager, Christian et al., "Analysis of Nonlinear Distortion in Phased Array Transmitters" 2017 International Workshop on Integrated Nonlinear Microwave and Millmetre-Wave Circuits (INMMiC), Apr. 20-21, 2017, Graz, Austria, 4 pages.

Martens, J. et al., "Towards Faster, Swept, Time-Coherent Transient Network Analyzer Measurements" 86th ARFTG Conf. Dig., Dec. 2015, 4 pages.

Martens, J., "Match correction and linearity effects on wide-bandwidth modulated AM-AM and AM-PM measurements" 2016 EuMW Conf. Dig., Oct. 2016, 4 pages.

Nopchinda, Dhecha et al., "Emulation of Array Coupling Influence on RF Power Amplifiers in a Measurement Setup", IEEE © 2016, 4 pages.

Pedro, Jose Carlos et al., "On the Use of Multitone Techniques for Assessing RF Components' Intermodulation Distortion", IEEE Transactions On Microwave Theory and Techniques, vol. 47, No. 12, Dec. 1999, pp. 2393-2402.

Ribeiro, Diogo C. et al., "D-Parameters: A Novel Framework for Characterization and Behavorial Modeling of Mixed-Signal Systems", IEEE Transactions On Microwave Theory and Techniques, vol. 63, No. 10, Oct. 2015, pp. 3277-3287.

Roblin, Patrick, "Nonlinear RF Circuits and Nonlinear Vector Network Analyzers; Interactive Measurement and Design Techniques", The Cambridge RF and Microwave Engineering Series, Cambridge University Press © 2011, entire book.

Rusek, Fredrik et al., "Scaling Up MIMO; Opportunities and challenges with very large arrays", IEEE Signal Processing Magazine, Jan. 2013, pp. 40-60.

Senic, Damir et al., "Estimating and Reducing Uncertainty in Reverberation-Chamber Characterization at Millimeter-Wave Frequencies", IEEE Transactions on Antennas and Propagation, vol. 64, No. 7, Jul. 2016, pp. 3130-3140.

(56) References Cited

OTHER PUBLICATIONS

Senic, Damir et al., "Radiated Power Based on Wave Parameters at Millimeter-wave Frequencies for Integrated Wireless Devices", IEEE © 2016, 4 pages.

* cited by examiner

SYSTEM AND METHOD FOR CALIBRATING VECTOR NETWORK ANALYZER MODULES

PRIORITY

This application claims the benefit of priority to U.S. Provisional Application No. 62/993,215 filed Mar. 23, 2020 titled "SYSTEM AND METHOD FOR CALIBRATING VECTOR NETWORK ANALYZER MODULES" which application is incorporated by reference in its entirety.

TECHNICAL FIELD

The present invention relates generally to vector network analyzers and more particularly, the present invention relates to systems and methods for calibrating vector network analyzers.

BACKGROUND

A common task in RF and microwave engineering involves the analysis of circuits using a network analyzer (VNA). The VNA is a reflectometer-based electronic instrument that can be used to measure the frequency response (magnitude and phase) of a device under test (DUT) such as an electrical network, component, circuit, or sub-assembly. This VNA can evaluate nearly all types of RF and microwave devices, including, filters, amplifiers, and complex multifunction and integrated systems. A Vector Network Analyzer contains both a source, used to generate a known stimulus signal, and a set of receivers, used to determine changes to this stimulus caused by the device-under-test or DUT. The stimulus signal is injected into the DUT and the Vector Network Analyzer measures both the signal that's reflected from the input side, as well as the signal that passes through to the output side of the DUT. The Vector Network Analyzer receivers measure the resulting signals and compare them to the known stimulus signal. The measured results are then processed by either an internal or external PC and sent to a display.

Vector Network Analyzer's perform two types of measurements—transmission and reflection. Transmission measurements pass the Vector Network Analyzer stimulus signal through the device under test, which is then measured by the Vector Network Analyzer receivers on the other side. The most common transmission S-parameter measurements are S21 and S12 (Sxy for greater than 2-ports). Swept power measurements are a form of transmission measurement. Some other examples of transmission measurements include gain, insertion loss/phase, electrical length/delay and group delay. Comparatively, reflection measurements measure the part of the VNA stimulus signal that is incident upon the DUT, but does not pass through it. Instead, the reflection measurement measures the signal that travels back towards the source due to reflections. The most common reflection S-parameter measurements are S11 and S22 (Sxx for greater than 2-ports).

Typically a VNA makes use of a frequency sweeping source or stimulus, directional couplers, and one or more receivers that provide ratioed amplitude and phase information such as reflection and transmission coefficients. The VNA utilizes scattering (S)-parameters to evaluate the characteristics of the device under test (DUT) with a high level of precision. S-parameters are a desirable method for measurement because they are relatively easy to derive at high frequencies and are directly related to parameters of interest including gain, return loss, and reflection coefficient. These parameters derived by use of the VNA are essential during design and testing of RF and microwave devices. The measurements made by the VNA can be analyzed to characterize the properties of the DUT.

A VNA must be calibrated in order to make accurate measurements in a particular test configuration. The internal frequency response of the VNA can be calibrated at the factory, however any cables connected externally will have some frequency response that must be calibrated out for high-quality measurements in the particular test configuration. In general calibration uses vector error correction in which error terms are characterized using known standards so that errors can be removed from actual measurements. The process of removing these errors requires the errors and measured quantities to be measured vectorially. The error measurements made during calibration permit the errors to be mathematically eliminated from the measurement results of the DUT.

Existing calibration systems and methods have a variety of weaknesses. One significant problem is where data collection during calibration does not provide enough information to accurately solve for the error coefficients. This results in an undetermined set of equations. If there are frequencies where this happens for the available lines, a singularity occurs and large spikes or instabilities in the calibrated data are possible. With existing calibration systems and methods, effort and calculations are required by the user to ensure that calibration problems do not happen, User expertise is required to determine which standards parameters are needed increasing the complexity of calibration processes.

Accordingly, it would be desirable to provide enhanced VNA calibration systems and methods which overcome the weakness of the prior art and ensure that calibration accurately determines error coefficients for VNAs while reducing complexity for the user.

SUMMARY OF THE INVENTION

The present disclosure describes enhanced VNA calibration systems and methods which overcome the weakness of the prior art and ensure that calibration accurately determines error coefficients for VNAs while reducing complexity for the user.

In embodiments, a new calibration system and method is provided which dynamically assigns match utilization to improve overall calibration accuracy and reduce problems from a non-optimal set of calibration components and simplify user input requirements during calibration.

Further objects and advantages of the present invention will become apparent to those skilled in the art from the following detailed description of the various embodiments, when read in light of the accompanying drawings.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Calibration

Calibration is critical to making good VNA S-parameter measurements. While the VNA is a highly-linear receiver and has sufficient spectral purity in its sources to make good measurements, there are a number of imperfections that limit measurements done without calibrations. These imperfections include:

1. Match—Because the VNA is such a broadband instrument, the raw match is decent but not excellent. Even a 20-dB match, which is physically very good, can lead to errors of greater than 1 dB. Correcting for this raw match greatly reduces the potential error.

2. Directivity—A key component of a VNA is a directional coupler. This device allows the instrument to separate the signal incident on the DUT from the signal reflected back from the DUT. While the couplers used in the VNA are of very high quality, there is a certain amount of coupled signal, even when a perfect termination is connected. This is related to directivity and can impact measurements of very small reflection coefficients.

3. Frequency Response—While the internal frequency response of the VNA could be calibrated at the factory, any cables connected externally will have some frequency response that must be calibrated out for high-quality measurements.

Calibration is a tool for correcting for these imperfections, as well as other defects. There are an enormous number of possible calibration algorithms and many of them are implemented within VNAs. The choice between them is largely determined by the media the engineer is working in, the calibration standards available and the desired accuracy/effort trade off. Each of these calibrations has an associated error model that describes what measurement imperfection is being corrected. The error models define error coefficients which fall into several categories that roughly describe the physical effect measurement imperfection that the coefficients are responsible for correcting.

Figure 1A:
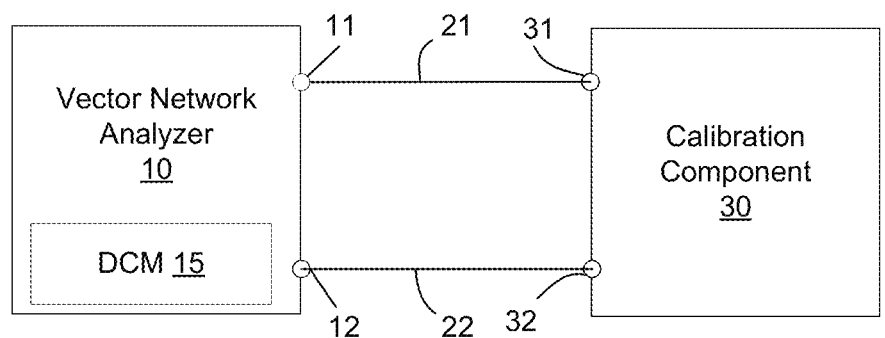
FIG. 1A shows a VNA calibration system according to an embodiment.

FIG. 1A shows a VNA calibration system according to an embodiment. As shown, in FIG. 1A, VNA 10 comprises a dynamic calibration module (DCM) 15 and two ports 11 and 12. Ports 11 and 12 are connected by line 31 and 32 to the connectors of calibration component 30. This connection depends on the type of component. For wafer standards for example probes are contacted with pads on the wafer. Calibration components may comprises one or more defined standards, lines, wafers or the like having known properties and developed for calibration of VNAs. VNA manufacturers typically provide calibration kits comprising calibration components for defined standards or line-based calibration or other methods. Kits can comprise discreet components, or integrated devices such as wafers integrating several calibration components. The kit components have known properties such that measurements of the components can be used to calibrate a VNA.

After connection the calibration component, a calibration routine is performed by the DCM 15 or VNA 10. VNA 10 and/or DCM 15 comprises a processor and memory configured to control measurements performed by the VNA, store data resulting from such measurements, and analyze such data in order to determine error coefficients for the VNA. The routine takes measurements of the calibration component, analyzes the results as compared to know properties of the calibration component 30, and determines error coefficients for the VNA. The error coefficients are then stored in memory of the VNA. In an embodiment DCM 15 implements a VNA calibration process that dynamically assigns match utilization to improve overall calibration accuracy and can help reduce problems from a non-optimal set of calibration components and simplify user input requirements.

Figure 1B:
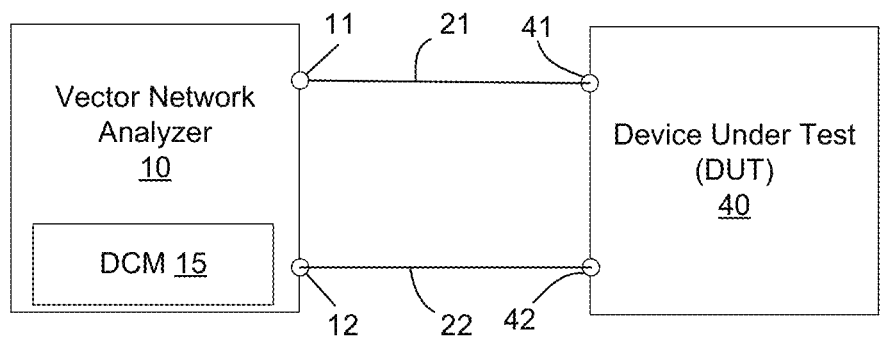
FIG. 1B shows a DUT characterization system using a calibrated VNA according to an embodiment.

FIG. 1B shows a DUT characterization system using a calibrated VNA according to an embodiment. As shown in FIG. 1B, after the VNA 10 is calibrated, the VNA is disconnected from the calibration component and lines 21 and 22 are connected to connectors 41 and 42 of a device under test (DUT) 40. The VNA may then makes measurements of the VNA, which DUT measurements can be corrected using the error coefficients previously stored in the memory of the VNA 10. The VNA 10 may then characterize the DUT 40 using the corrected DUT measurements.

Although the examples of FIGS. 1A, 1B show a 2-port VNA, the calibration analysis discussed below may also be applied to VNAs having different port configurations, including for example 4-prt VNAs.

Figure 2:
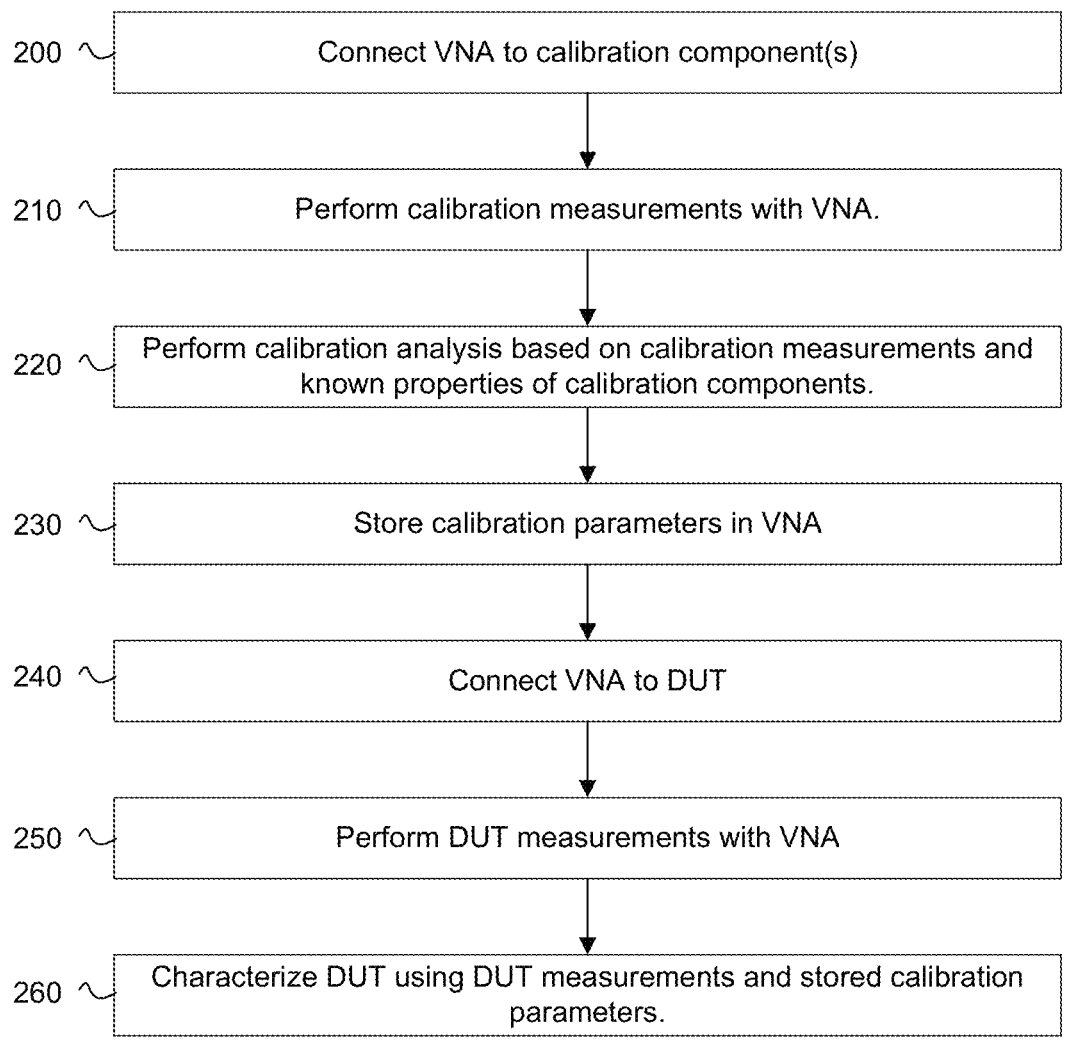
FIG. 2 shows a method for calibrating a VNA and characterizing a DUT according to an embodiment.

FIG. 2 shows a method for calibrating a VNA and characterizing a DUT according to an embodiment. At step 200, the VNA is connected to the calibration components. At step 210 the VNA performs measurements of the calibration components. At step 220 the VNA performs analysis of the measurements of the calibration components made by the VNA as compared to the known properties of the calibration components. In an embodiment the measurement and/or analysis steps implement a VNA calibration process that dynamically assigns match utilization to improve overall calibration accuracy and can help reduce problems from a non-optimal set of calibration components and simplify user input requirements. Based on this analysis the error coefficients for the VNA can be calculated. At step 230 the error coefficients are stored in memory of the VNA as calibration parameters. Calibration of the VNA is complete (steps 200, 210 220, 230).

At step 240 the VNA is connected to the DUT in place of the calibration component. At step 250 the VNA performs measurements of the DUT. These DUT measurements can be corrected using the error coefficients previously stored in the memory of the VNA. At step 260 the VNA characterizes the DUT based on the DUT measurements as corrected by the error coefficients are stored in memory of the VNA. Characterization of the DUT is now complete (steps 240, 250, 260).

Calibration Analysis

As described above, many VNA calibration component systems and methods exist. Calibrations systems and methods fall into two broad classes (at least among those methods that fully solve for the error coefficients) Defined Standards and Line-based methods.

Defined standards: The S-parameters of each calibration standard are specified. All the standards are measured using the VNA, and these measurements are used to solve for the error coefficients of the VNA. A match standard may or may not be part of the standards set but, if present, it is always used.

Line-based methods: Thru-reflect-line (TRL) and related methods fall into this class and are based on assumed ideality of transmission lines (single mode, all differences between lines are based on complex propagation only, etc.). Line-reflect-match (LRM), Line-reflect-reflect-match (LRRM) and related methods are part of this family that use a match standard (either defined by the user or partially solved for using line data) and the match data is always used to solve for directivity (and sometimes other) terms. Multiline TRL (mTRL) is also part of this family where a (potentially) large number of lines are used and the result optimized in a least-squares sense based on self-consistency of the measurements. The mTRL method does automatically underweight lines that do not contribute to the measurement but it is possible that the entire set of lines is not optimal. The TRL family of calibrations is generally band-limited. Multiple line variants (mTRL) help with this but the line set may still be non-optimal for the frequency range of interest.

All of the conventional methods have their weaknesses and in the line-based methods, one problem is when the collection of lines do not provide enough information to accurately solve for the error coefficients of the VNA. This happens when the line length differences are near 0 or a multiple of half-wavelengths since the S-parameters of the line are the same (if loss is low enough). This results in an undetermined set of equations. If there are frequencies where this happens for the available lines, a singularity occurs and large spikes or instabilities in the calibration data are possible.

With existing calibrations, effort and calculations are required by the user to ensure that the above problem does not happen (figuring out which standards parameters are needed, sometimes creating new standards, etc.). TRL (Thru, Reflect, Line) represents a family of calibration techniques that measure two transmission standards and one reflection standard to determine the 2-port 12-term error coefficients. For example, TRM (Thru, Reflect, Match), LRL (Line, Reflect, Line), LRM (Line, Reflect, Match) are all included in this family. mTRL helps to some degree since more lines are available (reducing the chances of singularities) but it is still possible that the problem will occur.

To illustrate the problems with conventional calibration, consider an extreme example involving a 2-port coaxial calibration covering 70 kHz-44 GHz. The user has selected TRL with two lines (0 and 16 mm) which is unfortunate for this frequency range since the lines have ~equal S-parameters at very low frequencies and at half-wavelength multiples (~9.4, 18.8, 28.2 and 27.6 GHz). A DUT is measured after performing this calibration and the resulting measurements are the solid curves shown in FIGS. 3 and 4. As shown in the FIGS. 3 and 4 the results are significantly in error in the vicinity of these singularities (~9.4, 18.8, 28.2 and 27.6 GHz). This will result in poor calibration of the VNA in the region of the singularities.

Figure 3:
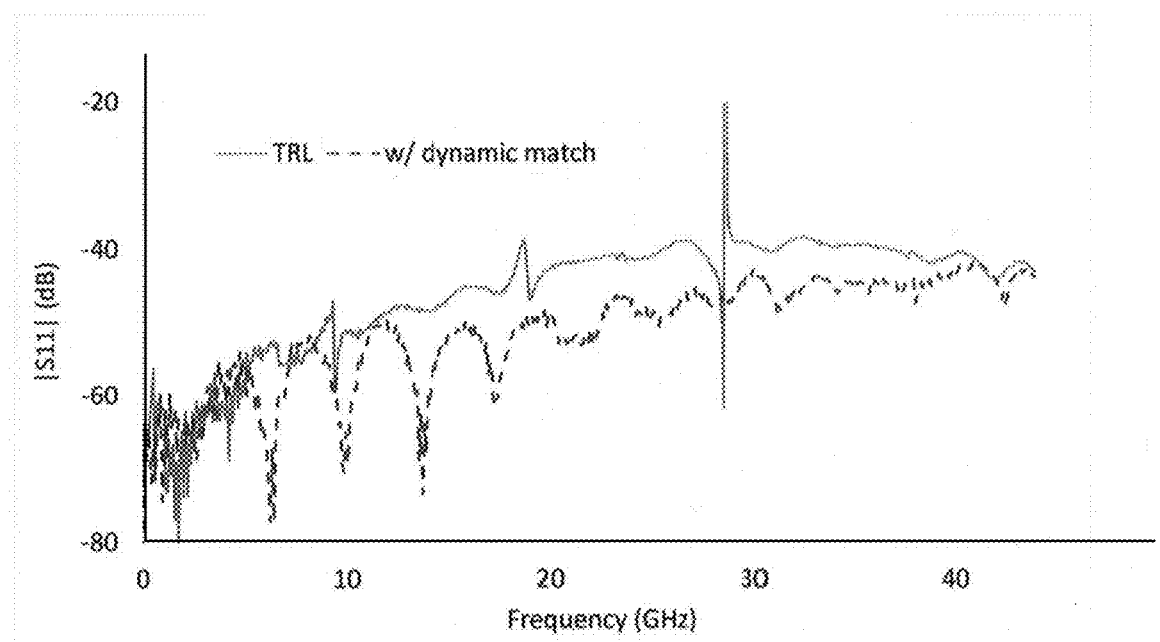
FIG. 3 illustrates VNA calibration results according to an embodiment.

FIG. 3 is a plot (solid line) of reflection measurements for the DUT after calibration of the VNA. The DUT is expected to have values in the −40 to −50 dB range at 40 GHz. The difference in the mean values in the FIG. 3 plot are believed to be due to connector repeatability rather than from algorithmic effects.

Figure 4:
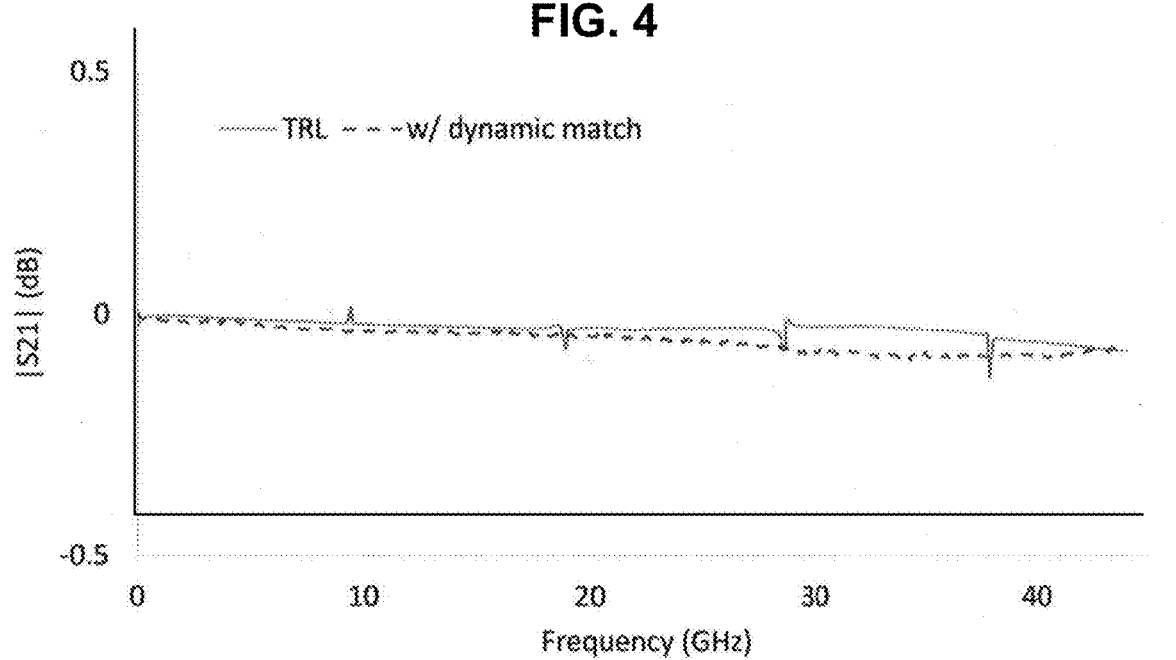
FIG. 4 illustrates VNA calibration results according to an embodiment.

FIG. 4 is a plot (solid line) of insertion loss measurements for the DUT after the calibration of the VNA described above. The values of deviation at the singularities are not very repeatable as they are sensitive to milli-dB variations in the raw parameters. Further, some post-processing schemes are sensitive to sudden data changes as they introduce passivity or causality violations. Such violations can cause simulations, using the corrected S-parameter data as input, to fail to converge and complicate the users' design or analysis work.

In order to correct the problems with the standard calibration analysis, the dynamic calibration module (DCM 15 of FIG. 1A implements an improved calibration analysis system. The improved calibration process dynamically assigns match utilization to improve overall calibration accuracy and can help reduce problems from a non-optimal set of calibration components and simplify user input requirements. The improved calibration analysis system is an enhancement to VNA calibration routines, particularly those relying on multiple lengths of transmission lines or multiple offset lengths of reflects to cover a frequency range.

The system is enhanced by including the use of an alternate calibration path (dependent on a match or non-full-reflect standard) when singularities are approached. The match-based calibration variant takes over when the original length set has numerical issues and results in a calibration with better residual errors. Accordingly, the analysis performed by the DCM dynamically switches between line and match based calibration over the frequency range to reduce numerical issue based problems in the calibration.

An LRM-variant is included in the calibration system and method such that an LRM-variant is included in the calibration when the line lengths (of offset lengths) in the TRL calibration approach a singularity. The LRM-variant automatically takes over the calibration from the TRL calibration in the problem frequency range. The degree of approach to the singularity may be user selectable such that the range of frequencies over which LRM is responsible in place of TRL can be selected by the user. The match model may be predefined of fit using other available standards data. According the DCM results in improved calibration data for the VNA by automatically selecting either LRM or TRL at different regions of the frequency range over which calibration is required.

As shown in FIGS. 3 and 4, the VNA calibration was repeated using the dynamic match selection with the algorithm looking for phase differences between line lengths coming within 10 degrees of problem areas. Such algorithm can be implemented in the DCM 15 of VNA 10. A simple match model was used. The resulting measurement of the same DUT is shown in the dashed lines of FIGS. 3 and 4. FIG. 3 shows a plot (dashed line) of reflection measurements for the DUT after calibration of the VNA using the enhanced method. FIG. 4 show a plot (dashed line) of insertion loss measurements for the DUT after the calibration of the VNA using the enhanced method. As shown by the dashed lines in FIGS. 3 and 4, the errors in the singular regions have been improved (as compared to the solid lines) and the data continuity in the problem regions is better than 0.01 dB in loss and 0.1 dB in reflection (and repeatability was much better). The residual tracking error has been reduced by more than two orders of magnitude.

Effectively, the VNA calibration was performed using a combination of TRL and LRM methodologies with dynamic switching between the two regimes over the wavelength range of the calibration. The looked for phase differences between line lengths coming within 10 degrees of problem areas (singularities) and to determine what in frequency ranges LRM should be used. Note that if the match standard (LRM) had been used for the whole frequency range, the result might have been less optimal since the model accuracy of the match standard is not often not as good as the fundamental characteristic impedance accuracy of the transmission lines.

Importantly for on-wafer calibrations, the match element is normally readily available and consumes little real estate (compared to adding several more transmission line sections).

From a convenience and practical speed point-of-view, the user also did not have to perform calculations off-line to determine when additional components would be used.

Although the examples of FIGS. 1A, 1B, 3 and 4 relate to a 2-port VNA, the calibration analysis discussed below may also be applied to VNAs having different port configurations, including for example 4-port VNAs.

In some embodiments, the present invention includes a computer program product, for example DCM 15, which can comprise a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In and embodiment DCM 16 comprises a VNA control systems including a processor configured to control the VNA to perform the processes of the present invention including dynamic match calibration and subsequent testing of a DUT using such calibration.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention. It is intended that the scope of the invention be defined by the following claims and their equivalents.

The invention claimed is:

1. A method for calibrating a vector network analyzer (VNA), the method comprising:
performing line-based calibration measurements;
performing match-based calibration measurements; and
dynamically assigning match utilization to improve overall calibration accuracy, wherein dynamically assigning match utilization comprises automatically determining the application of line-based calibration and match-based calibration.

2. The method of claim 1, further comprising storing error coefficients derived from said calibration in memory in said VNA.

3. The method of claim 2, further comprising measuring characteristics of a device using the VNA and correcting said measured characteristics using said error coefficients stored in said memory.

4. The method of claim 2, wherein dynamically assigning match utilization to improve overall calibration accuracy comprises calculating said error coefficients.

5. The method of claim 2, wherein dynamically assigning match utilization to improve overall calibration accuracy comprises calculating error coefficients and automatically determining the application of Thru-reflect-line (TRL) calibration and Line-reflect-match (LRM) calibration.

6. The method of claim 2, wherein dynamically assigning match utilization to improve overall calibration accuracy comprises automatically determining the application of Thru-reflect-line (TRL) calibration and Line-reflect-match (LRM) calibration, wherein LRM calibration is utilized in frequency ranges where TRL calibration approaches a singularity.

7. The method of claim 2, wherein dynamically assigning match utilization to improve overall calibration accuracy comprises automatically determining the application of Thru-reflect-line (TRL) calibration and Line-reflect-match (LRM) calibration, wherein LRM calibration is utilized in frequency ranges where TRL calibration is within user-specified limits of a singularity.

8. The method of claim 1 wherein match-based calibration is utilized in frequency ranges where line-based calibration approaches a singularity.

9. A vector network analyzer (VNA) comprising:
a calibration module configured to perform steps comprising:
performing line-based calibration measurements; and
performing match-based calibration measurements,
wherein match-based calibration is utilized in frequency ranges where line-based calibration approaches a singularity.

10. The VNA of claim 9, wherein the calibration module is configured to perform further steps comprising:
calculating error coefficients; and
storing said error coefficients in memory in said VNA.

11. The VNA of claim 9 further comprising dynamically assigning match utilization to improve overall calibration accuracy.

12. The VNA of claim 11, wherein dynamically assigning match utilization comprises automatically determining the application of line-based calibration and match-based calibration.

13. A method for operating a vector network analyzer (VNA), the method comprising:
performing line-based calibration measurements;
performing match-based calibration measurements; and
wherein match-based calibration is utilized in frequency ranges where line-based calibration approaches a singularity.

14. The method of claim 13, further comprising:
calculating error coefficients by dynamically assigning match utilization; and
storing said error coefficients in memory in said VNA.

15. The method of claim 14, further comprising measuring characteristics of a device using the VNA and correcting said measured characteristics using said error coefficients stored in said memory.

16. The method of claim 14, wherein calculating error coefficients by dynamically assigning match utilization comprises automatically determining the application of line-based calibration and match-based calibration.

17. The method of claim 14, wherein calculating error coefficients by dynamically assigning match utilization comprises automatically determining the application of Thru-reflect-line (TRL) calibration and Line-reflect-match (LRM) calibration.

18. The method of claim 14, wherein calculating error coefficients by dynamically assigning match utilization comprises automatically determining the application of Thru-reflect-line (TRL) calibration and Line-reflect-match (LRM) calibration, wherein LRM calibration is utilized in frequency ranges where TRL calibration approaches a singularity.

19. The method of claim 14, wherein calculating error coefficients by dynamically assigning match utilization comprises automatically determining the application of Thru-reflect-line (TRL) calibration and Line-reflect-match (LRM) calibration, wherein LRM calibration is utilized in frequency ranges where TRL calibration is within user-specified limits of a singularity.

20. The method of claim 13 further comprising dynamically assigning match utilization to improve overall calibration accuracy, wherein dynamically assigning match utilization comprises automatically determining the application of line-based calibration and match-based calibration.

* * * * *